United States Patent [19]
Mize

[11] 4,033,063
[45] July 5, 1977

[54] FISH LURE

[76] Inventor: Norman W. Mize, 7154 London Lane, Apt. C, Lemon Grove, Calif. 92045

[22] Filed: Jan. 19, 1976

[21] Appl. No.: 650,296

[52] U.S. Cl. .............................. 43/42.05; 43/42.06; 43/42.28
[51] Int. Cl.² ........................................ A01K 85/00
[58] Field of Search ........... 43/42.36, 42.05, 42.23, 43/42.06, 42.28

[56] References Cited
UNITED STATES PATENTS

| 2,556,634 | 6/1951 | Redinger | 43/42.36 |
| 2,577,402 | 12/1951 | Carnes | 43/42.36 |
| 2,756,532 | 7/1956 | Trester | 43/42.05 |
| 3,507,070 | 4/1970 | Rossello | 43/42.36 |

Primary Examiner—Warner H. Camp
Attorney, Agent, or Firm—William F. Frank

[57] ABSTRACT

A fish lure in one form has a hollow cylindrical body with an open front end in combination with leader connection means within the body a substantial distance from the front of the body. In another form the leader has a skirt and water divertor mounted thereon in trailing relation to the body.

7 Claims, 6 Drawing Figures

FISH LURE

BACKGROUND OF INVENTION

My U.S. Pat. No. 3,914,895 teaches the barreled out cylindral body portion of fish lures for purpose of facilitating skirt connections within the body for convenience of connecting linkage. However, that patent has the usual restricted orifice of entry of leader into the lure and the leader is attached near the front of the lure. It relies on features other than an opened entry way for the fishline leader. Also, that prior patent shows no special point of connection of the leader to the lure.

SUMMARY OF THE INVENTION

I have provided a fish lure that has, in combination, a relatively wide entry orifice for the usual leader and leader-to-lure novel connecting means positioned well within the body. This gives the surprising and extraordinary result of lure action which is strikingly like that of natural bait.

In addition, my novel fish lure features exterior body connection means for hooks which in relation to the angle of the nose portion, permit the lure to be used either as a top water lure or a sub-surface lure.

DESCRIPTION OF PREFERRED EMBODIMENTS

Figure 1:
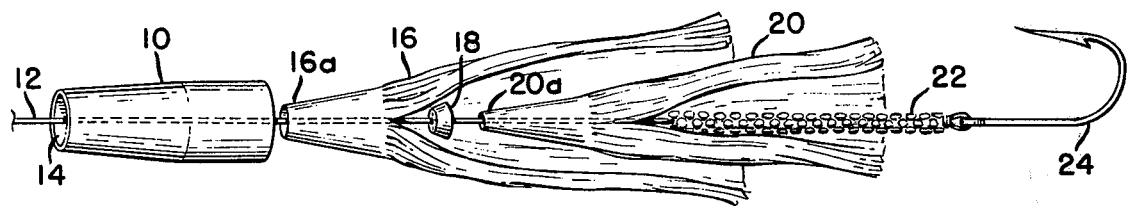
FIG. 1 is an exploded perspective view of an important form of my invention.
Figure 2:
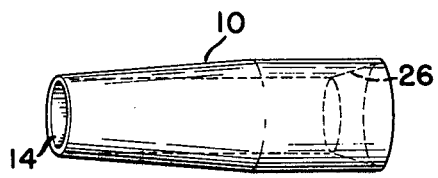
FIG. 2 is a perspective view of the body portion.
Figure 4:
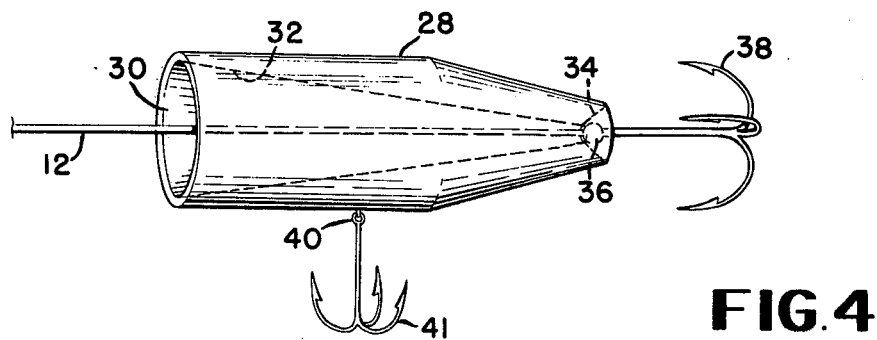
FIG. 4 is a perspective view of a modification of my fish lure.
Figure 5:
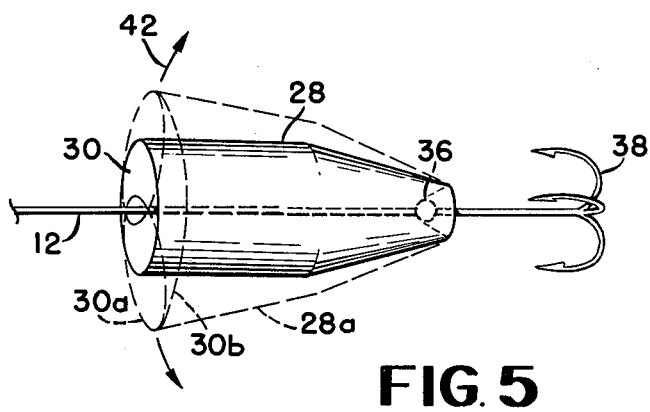
FIG. 5 is the same FIG. 4 showing the movement capabilities of the lure.

In the drawing the numeral 10 is the body portion; 12 is the usual fishline leader; 14 is my novel open nose portion of the body shown in FIG. 1 and FIG. 2; the numeral 30 is such nose portion in FIG. 4 and FIG. 5. Because there is an unusually large space around the leader where it enters the body, a great amount of movement, in all lateral directions, results as the lure is pulled through the water. The body cavity is substantially hollow. Numerals 30a and 30b of FIG. 5 show representative positions of the nose as the front end of the body moves in the direction of arrows 42. Dotted line 32 outlines the limits of leader movement within the body. The opportunity for such desirable action is enhanced by the fact that the leader is connected to the body at a place other than near the front. The connection is preferably in the rearward one half of the lure body, and may be near the end as illustrated at point 36 of FIG. 4 and FIG. 5. As can be seen, I prefer to use a conical configuration 34 with a forward apex as a seat for the connecting means between leader and body. Tension on the line causes a snug fitting wedge action when needed, with a desired relaxation when not in use. Rear hook 38 may thusly be easily changed.

Figure 3:
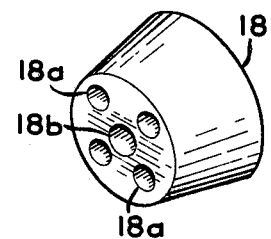
FIG. 3 is a perspective view of a novel plug connecting means.

To add to the illusion of live bait I have invented a water jet plug 18 which may be used in the linkage between leader 12 and rear hook 24 as in FIG. 1. It is preferably a cone section in shape and has multiple satellite orifices 18a around center orifice 18b as can best be seen in FIG. 3. The orifices extend the entire length of the plug to permit water to pass through. The passage of water moves strands of tandem plastic skirts 16 and 20 for additional simulation of live bait action. The assembly fits together by the leader passing through the central orifice 18b of plug 18. Its sides fit snugly in tapered walls 26. Beads 22 also surrounding the leader and move the front 20a of skirt 20 against the rear of plug 18 because the connected hook 24 brings the parts together as it moves in the direction of the body portion. The front 16a of outside skirt 16 is held between the outer walls of the plug and inner walls of the body.

Figure 6:
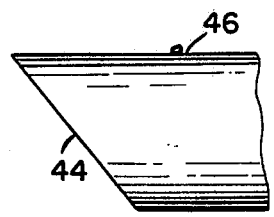
FIG. 6 is a side elevation of the nose portion of one form of my lure.

Finally, I have provided a lateral hook connecting means, preferably an eyelet, 46 for use in the form of the lure having a tapered nose section 44. With such arrangement the same lure may be used as a surface lure or sub-surface lure, depending on the place of hook attachment to the body. With the angle positioned as illustrated in FIG. 6 the lure will be on the water surface by obvious ski action. In such event, a bottom hook 41 on connecting means 40 (as in FIG. 4) will suffice. For use under surface, the lure is turned over for a plowing action of leading edge 44. In this arrangement a hook can be installed at means 46, which will then be on the bottom and with the other hook removed.

I claim:
1. A fish lure comprising: a body having a truncated cone portion joined to a cylindrical portion, said body having an axial hollow therethrough of substantial diameter through which a leader for a hook assembly may be freely passed and simultaneously allow the free flow of water through said body hollow around said leader towards said hook assembly; at least one skirt having a hollow, truncated cone shaped front portion with a plurality of strands extending from the periphery of said front portion, the nose opening said front portion being of a diameter sufficient to freely receive said leader and simultaneously to allow free flow of water from said body hollow through the interior of said front portion; an flow diverter means slidably placed on said leader for insertion into said front portion of said skirt to hold said front portion in contact with the surface of said body hollow and being formed to direct the flow of water entering said front portion as a plurality of streams against the inner surfaces of said strands to move said strands outwardly.

2. The fish lure according to claim 1 wherein the front of the lure body is tapered and there are a plurality of oppositely disposed hook connecting means positioned on the lateral exterior of the body.

3. The fish lure according to claim 1 wherein said flow diverter comprises a cone shaped plug having a truncated end, a central orifice to receive said leader in slidable relationship and a plurality of axial orifices surrounding said central orifice.

4. The fish lure according to claim 1 wherein at least a portion of the body hollow has the cross-section of a truncated cone and said at least portion is at least within the cylindrical portion of said body.

5. The fish lure according to claim 1 wherein there is a second skirt having a truncated conical front portion with a plurality of trailing strands, said front portion having a passageway therethrough for said leader, said second skirt being inserted within said at least one skirt and in contact with the base of said flow diverter means.

6. The fish lure according to claim 5 further comprising a plurality of bead elements slidably received on said leader and placed within said at least one skirt.

7. The fish lure according to claim 1 further comprising at least one means on the exterior surface of said body to which means an additional hook assembly may be attached.

* * * * *